United States Patent [19]
Kamata

[11] Patent Number: 6,011,927
[45] Date of Patent: *Jan. 4, 2000

[54] CAMERA HAVING PROTECTIVE LENSES TO PROTECT MOTION COMPENSATION LENS

[75] Inventor: Tetuji Kamata, Kawasaki, Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/908,698

[22] Filed: Aug. 8, 1997

[30] Foreign Application Priority Data

Sep. 10, 1996 [JP] Japan ................................. 8-238857

[51] Int. Cl.$^7$ .................................................. G03B 17/00
[52] U.S. Cl. ............................................. 396/55; 359/557
[58] Field of Search ............................... 396/52, 53, 54, 396/55; 359/554, 555, 556, 557

[56] References Cited

U.S. PATENT DOCUMENTS 5,606,456 2/1997 Nagata et al. .................... 359/557 X
5,677,791 10/1997 Yoshibe et al. ..................... 396/55 X

FOREIGN PATENT DOCUMENTS 6-067246 3/1994 Japan .
9-80286 3/1997 Japan .
9-90190 4/1997 Japan .

OTHER PUBLICATIONS

U.S. application No. 08/654,321, Imura, filed Jun. 16, 1998.

*Primary Examiner*—Howard B. Blankenship

[57] ABSTRACT

A camera which includes a compensation lens, a drive mechanism, a frame and a protective member. The compensation lens is movable in a direction substantially perpendicular to the optical axis of the camera to compensate for motion of the camera, such motion typically caused by hand tremor or other vibration affecting the camera. The drive mechanism moves the lens. The frame holds the lens and the drive mechanism. The frame has a first end and a second end so that light travelling along the optical axis of the lens apparatus passes through the first end to pass through the compensation lens and then out the second end. The protective member is positioned in either or both of the first and second ends of the frame, to protect the compensation lens and the drive mechanism. For example, the protective member can include a first protective lens positioned in the first end of the frame, and/or a second protective lens positioned in the second end of the frame.

9 Claims, 5 Drawing Sheets

CAMERA HAVING PROTECTIVE LENSES TO PROTECT MOTION COMPENSATION LENS

CROSS-REFERENCE TO RELATED APPLICATIONS

This application is based on, and claims priority to, Japanese application number 08-238857, filed Sep. 10, 1996, in Japan, and which is incorporated herein by reference.

BACKGROUND OF THE INVENTION

1. Field of the Invention

The present invention relates to a camera having a motion compensation device which shifts a compensation lens to compensate for motion affecting the camera. More specifically, the present invention relates to a motion compensation device having a protective member which protects the compensation lens.

2. Description of the Related Art

Optical systems project an image onto an image plane. Conventional image blur suppression devices suppress, or reduce, blurring of the image. A motion compensation device is a type of image blur suppression device, and compensates for motion incident upon the optical system. Motion is typically imparted to the optical system by vibrations in the optical system, or in a surrounding holding member. In general, conventional motion compensation devices cause a compensation lens to shift counter to the motion of the optical system so as to shift the image projected by the optical system relative to the optical system.

Conventional cameras use a motion compensation device to suppress image blur resulting from motion of the camera. Such motion is typically caused by hand tremors of the photographer.

A camera having a conventional motion compensation device is disclosed, for example, in Japanese laid-open patent publication No. H6-67246. In Japanese laid-open patent publication No. H6-67246, a compensation lens is retained by a lens frame. A coil is provided on the lens frame in both X- and Y-axis directions.

A support member that supports a yoke and a permanent magnet is fixed on a lens barrel for each coil in the X- and Y-axis direction. The yoke and permanent magnet, along with the coils, form a part of a drive mechanism that drives the lens frame.

A magnetic field is created between the yoke and permanent magnet. When the electrical current flows in the coils, the lens frame moves in a direction that is perpendicular to the optical axis of the camera, due to the driving force in the XY directions.

Therefore, the compensation lens and the drive mechanism (that is, the yoke, the permanent magnet, and the coils) together form the motion compensation device of the camera. This motion compensation device is integrated in a specific position inside a lens barrel of the camera.

Unfortunately, there is no protective member positioned adjacent to the compensation lens. Therefore, the compensation lens and drive mechanism are easily damaged by, for example, particles entering the lens barrel.

In addition, the drive mechanism is difficult to adjust due to its complex configuration. As a result, it is difficult to maintain the relative position of the compensation lens with respect to other lens groups in the camera, and with respect to an aperture unit and/or a shutter unit.

Further, it is difficult to install or replace the motion compensation device in the lens barrel, due to the various lenses and other components in the lens barrel. For example, during installation of the motion compensation device, the risk of inadvertently scratching the compensation lens, or damaging the drive mechanism, is very high.

SUMMARY OF THE INVENTION

Accordingly, it is an object of the present invention to provide a camera having a motion compensation device that can be easily installed in a lens barrel and aligned with respect to other lenses or components in the lens barrel.

In addition, it is an object of the present invention to provide a camera having a protective member which protects a compensation lens and a drive mechanism of a motion compensation device.

Additional objects and advantages of the present invention will be set forth in part in the description which follows, and, in part, will be obvious from the description, or may be learned by practice of the invention.

The foregoing objects of the present invention are achieved by providing a lens apparatus having an optical axis extending therethrough. The lens apparatus includes a compensation lens, a drive mechanism, a frame and a protective member. The compensation lens is movable in a direction not parallel to (and preferably substantially perpendicular to) the optical axis to compensate for motion of the lens apparatus. The drive mechanism moves the lens in the direction not parallel to the optical axis. The frame holds the lens and the drive mechanism. The frame has a first end and a second end so that light travelling along the optical axis of the lens apparatus passes through the first end to pass through the compensation lens and then out the second end. The protective member is positioned in one of the first end and the second end of the frame, to protect the compensation lens and the drive mechanism.

The protective member can include a first protective lens positioned in the first end of the frame so that light travelling along the optical axis of the lens apparatus passes through the first protective lens and then through the compensation lens. In this case, the first protective lens moves with the compensation lens while the relative position of the first protective lens to the compensation lens in the optical axis direction is maintained.

In addition, the protective member can include both a first protective lens positioned in the first end of the frame and a second protective lens positioned in the second end of the frame. In this case, the first protective lens and the second protective lens would move with the compensation lens while the relative positions of the first protective lens, the compensation lens and the second protective lens to each other in the optical axis direction are maintained.

Further, instead of using protective lenses to protect the compensation lens and the drive mechanism, a protective member can be an aperture unit or a shutter unit positioned in either the first or second end of the frame.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
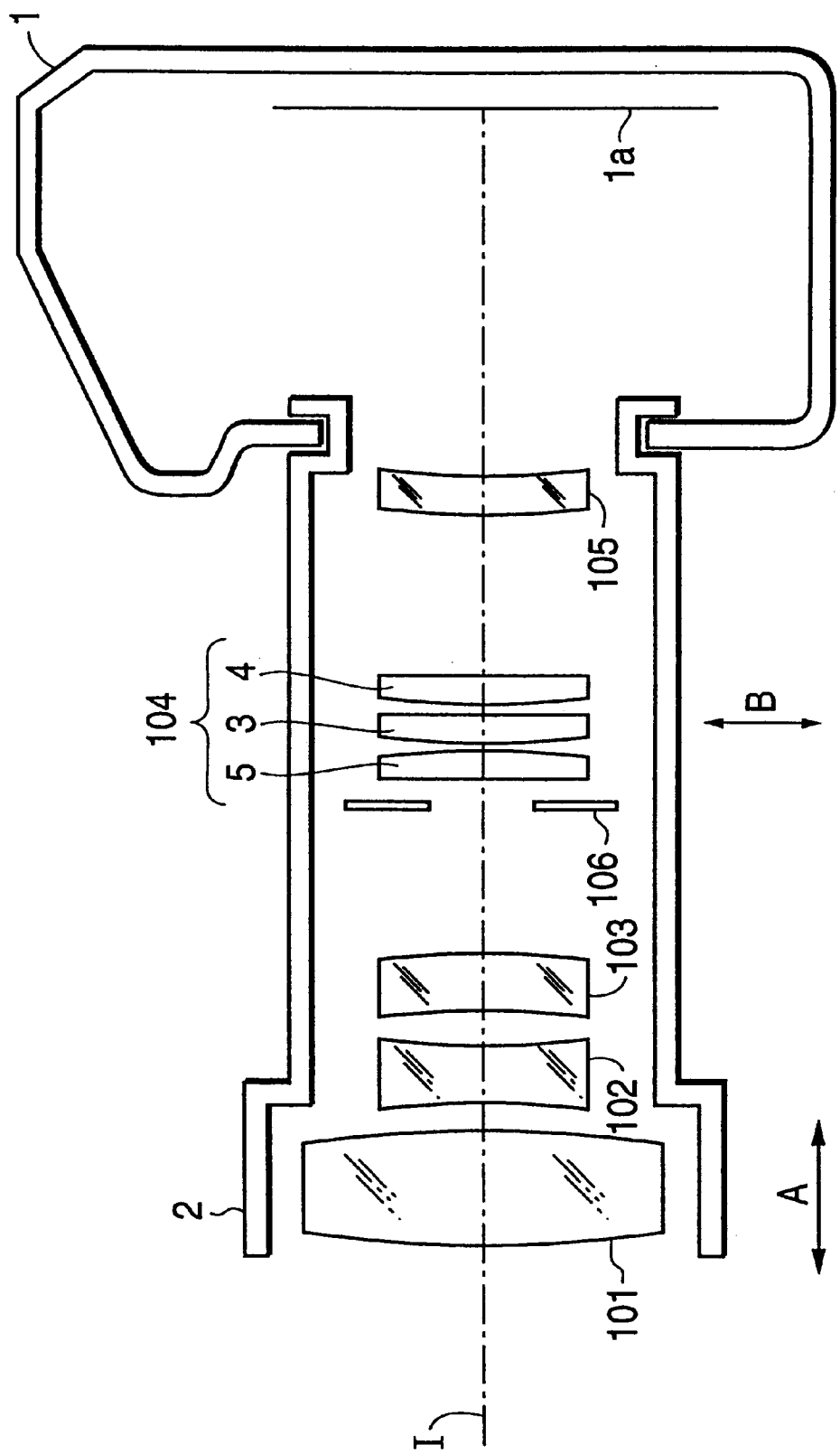
FIG. 1 is a diagram illustrating a cross-section of a single lens reflex camera having a motion compensation device, according to an embodiment of the present invention.

Reference will now be made in detail to the present preferred embodiments of the present invention, examples of which are illustrated in the accompanying drawings, wherein like reference numerals refer to like elements throughout.

FIG. 1 is a diagram illustrating a cross-section of a single lens reflex camera having a motion compensation device, according to an embodiment of the present invention. Referring now to FIG. 1, a camera body 1 has a lens barrel 2 attached thereto. Lens barrel 2 is illustrated as being a zoom lens including a first lens group 101, a second lens group 102, a third lens group 103, a fourth lens group 104 and a fifth lens group 105. Lens barrel 2 also includes an aperture unit 106.

Fourth lens group 104 includes a compensation lens 3 which is driven in a direction not parallel to, and preferably substantially perpendicular to, the optical axis I, to compensate for motion affecting the camera. That is, compensation lens 3 moves in the direction B to compensate for motion.

Fourth lens group 104 also includes protective lenses 4 and 5, to protect compensation lens 3. Protection lenses 4 and 5 move with compensation lens 3 in the direction A. Moreover, the relative positioning of compensation lens 3 to protective lenses 4 and 5 is preferably maintained as compensation lens 3 and protective lenses 4 and 5 move in the direction A.

First lens group 101 moves in a direction A, which is parallel to the optical axis I of the lens barrel, to adjust the focus and thereby form an image of a subject on an image forming plane 1a.

Lens barrel 2 changes magnification by moving first lens group 101, second lens group 102, third lens group 103, fourth lens group 104, fifth lens group 105, and aperture unit 106 along the direction A (that is, parallel to the optical axis I). Moreover, when changing the magnification, lens barrel 2 maintains the relative positions of compensation lens 3, protective lenses 4 and 5, and aperture unit 106 with respect to each other, in the direction A.

Next, an explanation is provided for a drive mechanism to drive compensation lens 3.

Figure 2:
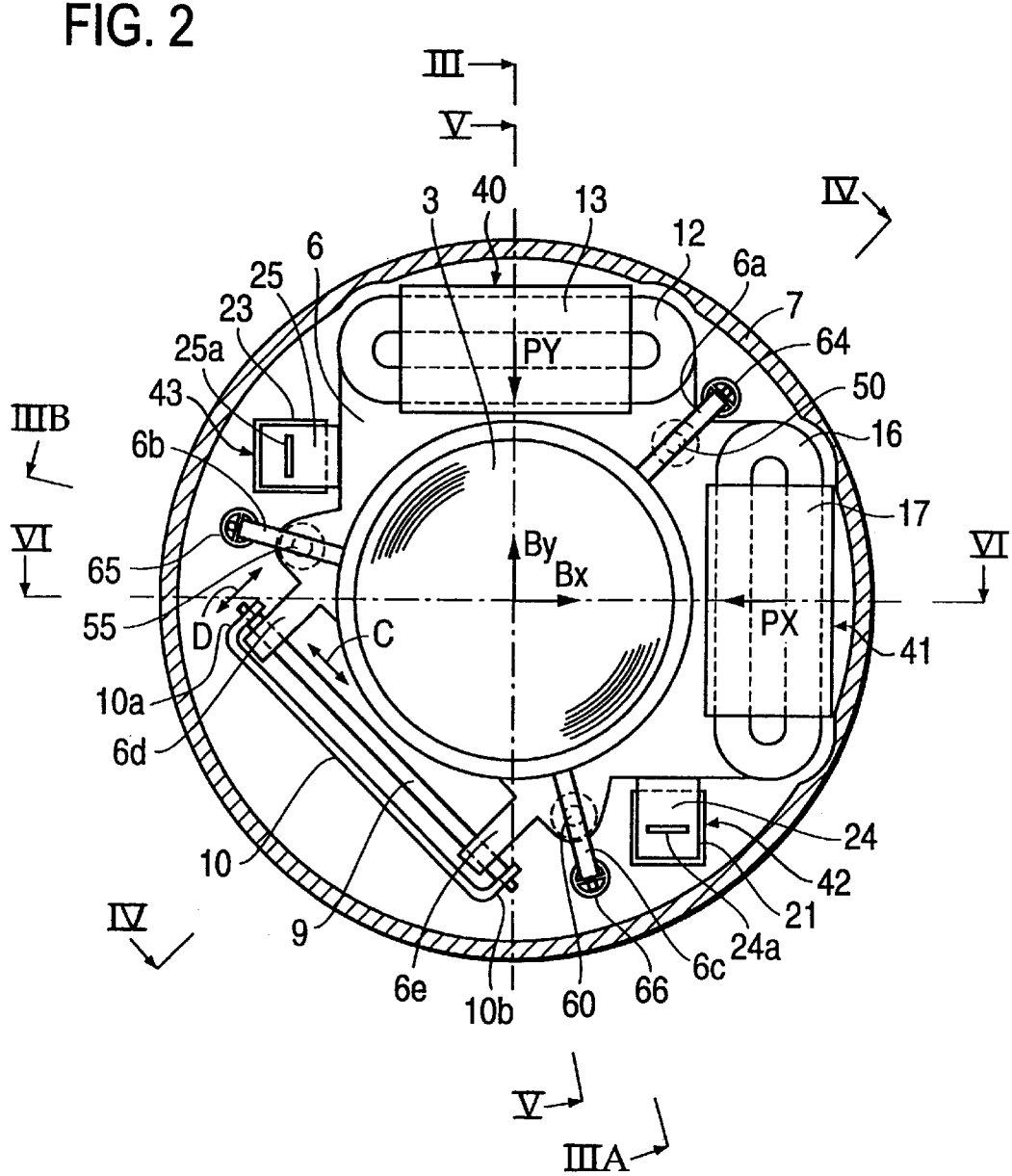
FIG. 2 is a diagram illustrating a cross-section of a camera lens barrel having a motion compensation device, according to an embodiment of the present invention.
Figure 3:
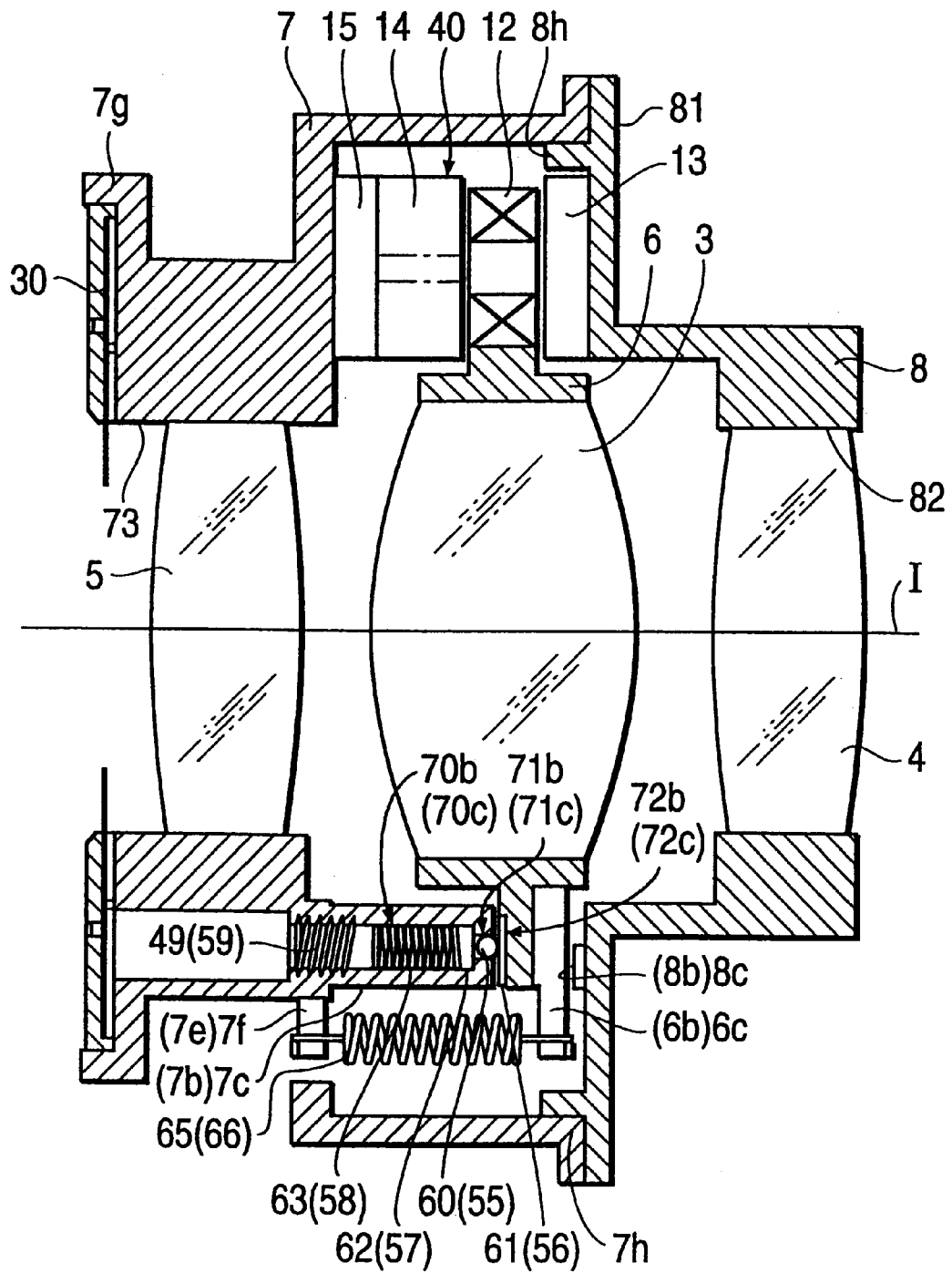
FIG. 3 is a diagram illustrating a cross-section along the line III–IIIA in FIG. 2, and which also illustrates elements observable in a cross-section along the line III–IIIB in FIG. 2, of a camera lens barrel having a motion compensation device, according to an embodiment of the present invention.

FIG. 2 is a diagram illustrating a cross-section of a camera lens barrel having a motion compensation device, according to an embodiment of the present invention. FIG. 3 is a diagram illustrating a cross-section along the line III–IIIA in FIG. 2, according to an embodiment of the present invention. Also, in FIG. 3, reference numbers in the cross sectional view that dissect along the line III–IIIB in FIG. 2 are shown in parentheses "( )" in FIG. 3. Moreover, FIG. 4 is a diagram illustrating a cross-section along the line IV—IV in FIG. 2, according to an embodiment of the present invention.

Figure 4:
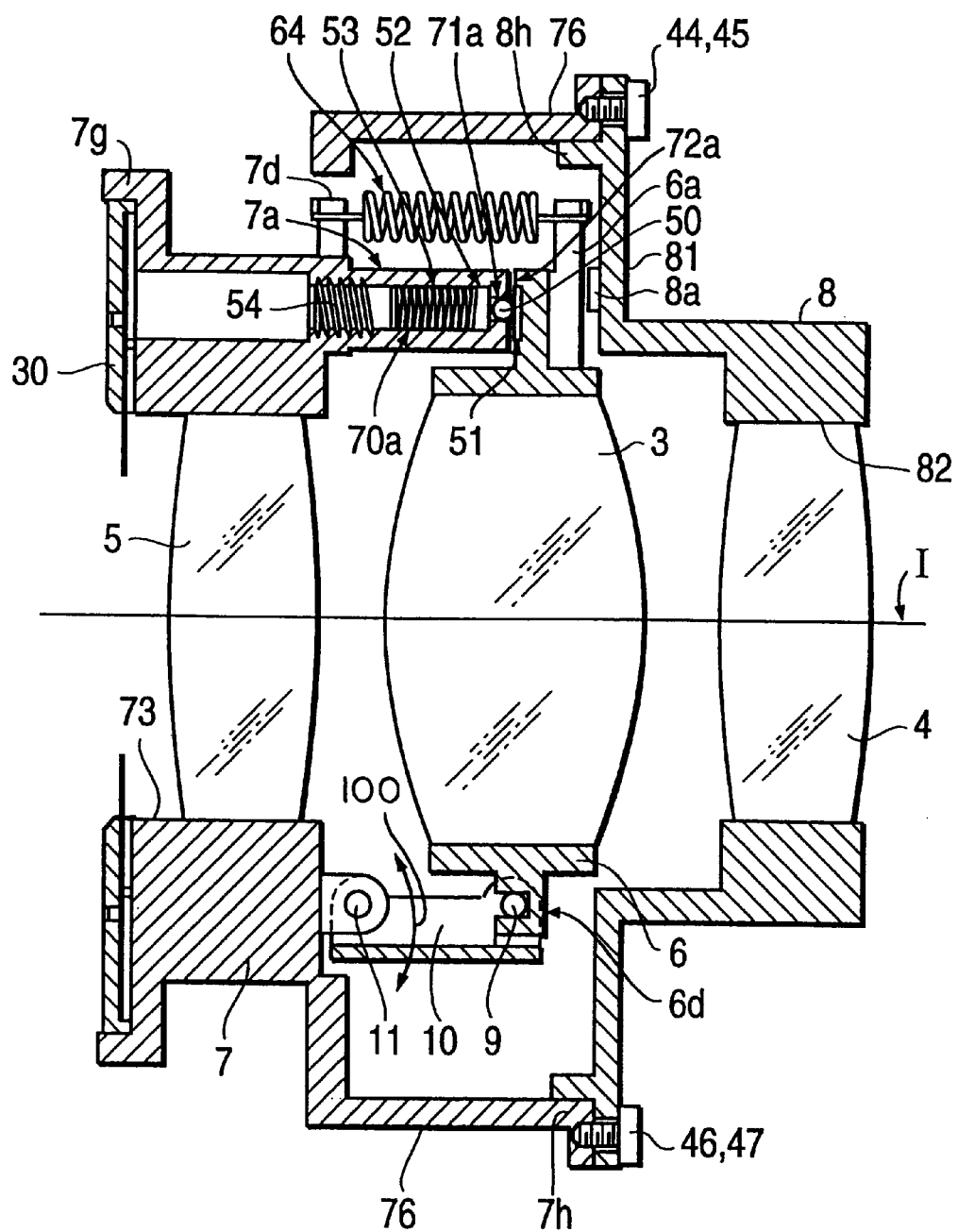
FIG. 4 is a diagram illustrating a cross-section, along the line IV—IV in FIG. 2, of a camera lens barrel having a motion compensation device, according to an embodiment of the present invention.

Referring now to FIGS. 2, 3 and 4, lens frame 6 retains compensation lens 3. Spring suspending sections 6a, 6b, and 6c, and hook sections 6d and 6e, are positioned along the outer perimeter of lens frame 6, as shown in FIG. 2. Slit members 24 and 25 are installed on lens frame 6 for position sensors 42 and 43, respectively, as shown in FIG. 2. Coil 12 is installed on lens frame 6 for voice coil motor (VCM) 40 (see FIG. 3), and coil 16 is installed on lens frame 6 for voice coil motor (VCM) 41 (see FIG. 2).

Furthermore, as shown in FIGS. 3 and 4, rigid ball contacting members 51, 56, and 61 correspond, respectively, to rigid ball 50, 55, and 60, and are formed on lens frame 6. Rigid ball contacting members 51, 56, and 61 guide the movement of lens frame 6 when lens frame 6 moves in a direction perpendicular to the optical axis I. More specifically, rigid ball contact members 51, 56 and 61 contact rigid balls 50, 55, and 60, respectively, to facilitate the movement of lens frame 6.

Facets 72a, 72b, and 72c correspond, respectively, to rigid ball integration sections 7a, 7b, and 7c. Rigid ball contacting members 51, 56, and 61 are made of a metal that is harder than rigid balls 50, 55, and 60. It is preferable to form the surface of rigid ball contacting members 51, 56, and 61 in a flat plane so that they make a flat contact with facets 72a, 72b, and 72c.

Base frame 7 is a housing which accommodates and protects lens frame 6, as well as voice coil motors 40 and 41, guiding shaft 9, springs 64, 65, and 66. Moreover, hereinafter, voice coil motors 40 and 41, guiding shaft 9, springs 64, 65, and 66, may collectively be referred to as a "drive mechanism" for moving compensation lens 3.

As shown in FIGS. 3 and 4, protective lens 5, aperture unit 30, rigid ball integration sections 7a, 7b, and 7c, spring suspending sections 7d, 7e, and 7f, and axis 11 are attached to base frame 7. Springs 64, 65, and 66 have one end attached to spring suspending sections 7d, 7e, and 7f, respectively.

Figure 5:
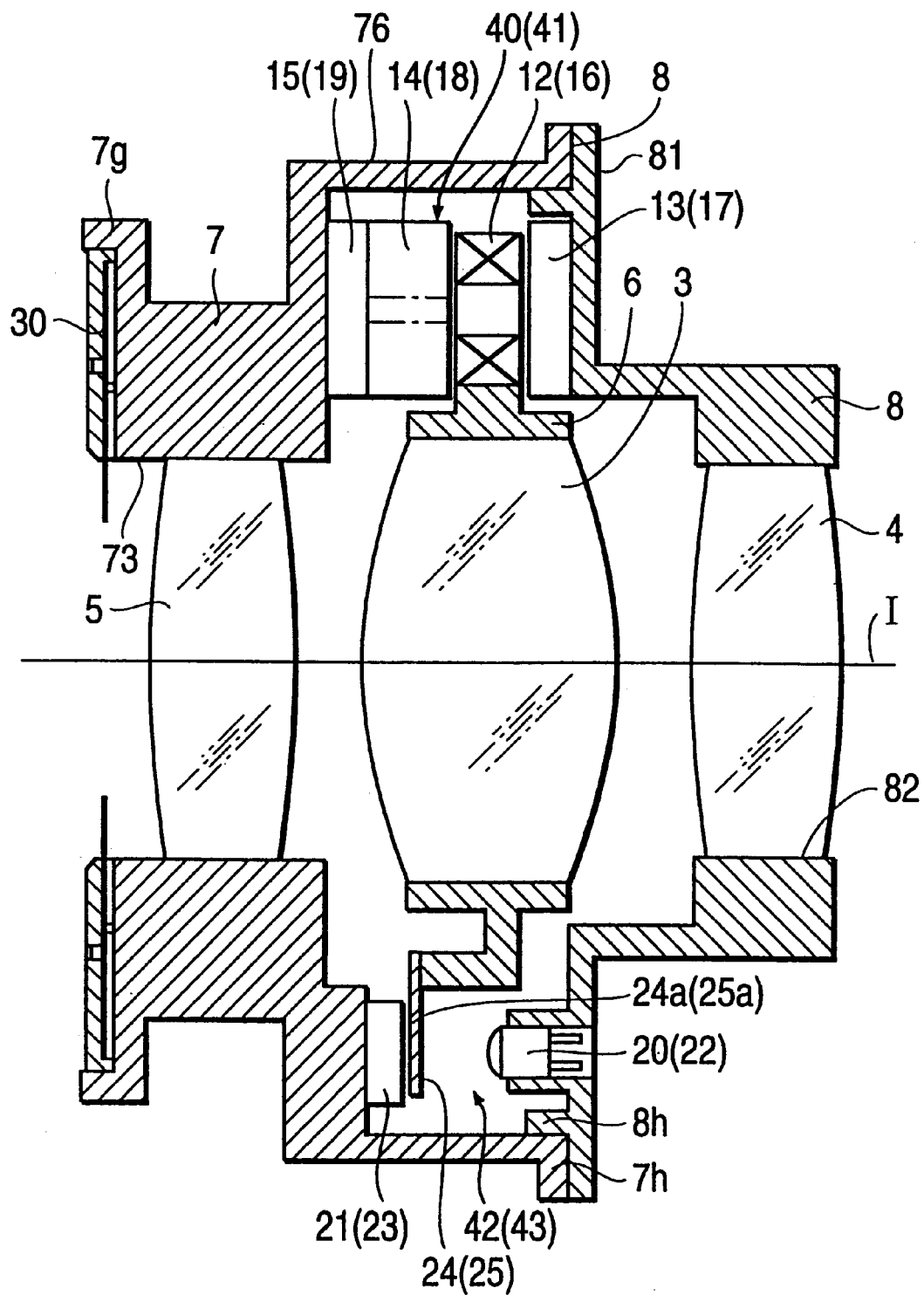
FIG. 5 is a diagram illustrating a cross-section along the line V—V in FIG. 2, and which also illustrates elements observable in a cross-section along the line VI—VI in FIG. 2, of a camera lens barrel having a motion compensation device, according to an embodiment of the present invention.

As shown in FIGS. 3 and 5, yokes 15 and 19 of voice coil motors 40 and 41, respectively, as well as photo sensors (PSD) 21 and 23 of position sensors 42 and 43, are provided on base frame 7.

Lens frame 6 is accommodated in base frame 7. A frame member 8 retains retaining protective lens 4, as well as protects the drive mechanism and lens frame 6. As shown in FIGS. 3 and 5, yokes 13 and 17 of voice coil motors 40 and 41, as well as light emitting elements (LED) 20 and 22 of position sensors 42 and 43, respectively, are provided inside of frame member 8. As shown in FIGS. 3 and 4, lens frame contacting sections 8a, 8b, and 8c are also provided inside of frame member 8.

Lens frame contacting sections 8a, 8b, and 8c catch lens frame 6 when lens frame 6 moves to the right in FIGS. 3 and 4. In addition, lens frame contacting sections 8a, 8b and 8c restrict the distance of the movement of lens frame 6 within a specified range.

It is preferable to form the surface of lens frame contacting sections 8a, 8b, and 8c in a flat plane so that they make a flat contact with lens frame 6. It is also preferable that the distance between lens frame 6 and lens frame contacting sections 8a, 8b, and 8c be set so that rigid balls 50, 55, and 60 do not fall away from rigid ball accommodation sections 71a, 71b, and 71c, respectively, when rigid ball contacting members 51, 56, and 61 move away from facets 72a, 72b, and 72c.

Position setting sections 7h and 8h are mutually engaged so that the relative positional relationship between base frame 7 and frame member 8 does not change. Position setting section 7h is formed on flange section 76, which is provided on the edge of base frame 7. Position setting section 8h is formed on a lid part 81 provided on the edge of frame member 8. Position setting sections 7h and 8h are joined by fastening screws 44, 45, 46, and 47 so that they do not dislocate from each other. Therefore, the relative positional relationship between base frame 7 and frame member 8 is securely maintained.

By mutually engaging and joining position setting sections 7h and 8h, lens frame 3 and the drive mechanism are enclosed by base frame 7, frame member 8, and protective lenses 4 and 5.

Protective lenses 4 and 5, together with compensation lens 3, form a lens group, such as fourth lens group 104 in FIG. 1. Protective lenses 4 and 5 protect compensation lens 3 and the drive mechanism accommodated within base frame 7. Protective lens 5 is fixed to an opening section 73 of base frame 7 so that the lens center of protective lens 5 coincides with optical axis I. The position of the lens center of protective lens 5 is precisely set without changing its location relative to compensation lens 3.

Similarly, protective lens 4 is fixed to an opening section 82 of frame member 8 so that the lens center of protective lens 4 coincides with optical axis I. The position of the lens center of protective lens 4 is precisely set without changing its location relative to compensation lens 3.

Aperture unit 30 controls light flux travelling along the optical axis I. For example, aperture unit 30 controls the amount of light travelling along the optical axis I. Aperture unit 30 is attached to aperture unit engaging section 7g provided on base frame 7. Preferably, aperture unit 30 is attached to aperture unit engaging section 7g by, for example, fastening screws (not illustrated). Aperture unit engaging section 7g is provided to precisely fix aperture unit 30 to protective lens 5, as well as to coincide the center of aperture unit 30 with optical axis I. By providing aperture unit 30 on aperture unit engaging section 7g, the position of compensation lens 3 and protective lens 4 can be precisely set.

A guiding shaft 9 guides lens frame 6 when lens frame 6 moves in a direction perpendicular to optical axis I. Guiding shaft 9 is arranged in the direction (direction C in the FIG. 2) that intersects with both the BX and BY directions in FIG. 2 at a right angle. Hook parts 6d and 6e engage with guiding shaft 9 so that they glide freely.

Guide arm 10 is for moving lens frame 6 in parallel with the guiding direction (direction C in the FIG. 2) of guiding shaft 9. Guide arm 10 has bent parts 10a and 10b on both ends, and guiding shaft 9 is supported by bent parts 10a and 10b so that it can rotate.

As shown in FIG. 4, guide arm 10 is supported in such a manner that it can rotate in the direction of arrow 100 (see FIG. 4) with its base frame 7 side held against shaft 11. As guide arm 10 turns, lens frame 6 can move in the direction D (see FIG. 2) that intersects with the guiding direction (direction C) of guiding shaft 9.

As shown in FIG. 2, voice coil motors 40 and 41 drive lens frame 6 by applying a force to lens frame 6 in both the BY and BX directions, respectively. Voice coil motors 40 and 41 preferably have the same configuration, but each applies a force in a different direction to lens frame 6.

As shown in FIG. 3, voice coil motor 40 includes yoke 13, a permanent magnet 14 that forms a magnetic field between yoke 13, a coil 12 placed between yoke 13 and permanent magnet 14, and yoke 15 that keeps permanent magnet 14 in place. When electrical current is applied to coil 12, compensation lens 3 is driven due to thrust PY (see FIG. 2) which is downward along the axis line in the BY direction (hereinafter referred to as the "BY direction axis"). When electrical current is applied to coil 12 in the opposite direction, compensation lens 3 is driven by a force in the opposite direction.

Position sensors 42 and 43 detect the position of compensation lens 3 in both the BY and BX directions, respectively. Position sensor 42 will be described in more detail with reference to FIG. 5.

More specifically, FIG. 5 is a diagram illustrating a cross-section, along the line V—V in FIG. 2, according to an embodiment of the present invention. Also, in FIG. 5, reference numbers in the cross sectional view that dissect along the line VI—VI in FIG. 2 are shown in parentheses "( )" in FIG. 5.

Position sensor 42 includes a light emitting element 20, a photo sensor 21, and a slit 24a created in slit member 24 and positioned between light emitting element 20 and photo sensor 21. Light emitted from light emitting element 20 passes through slit 24a and reaches photo sensor 21. If slit 24a moves, the location of the light that passes through slit 24a and reaches photo sensor 21 also changes. As the change of location of the light alters the output signal from photo sensor 21, the location of compensation lens 3 in the BY direction can be detected according to the changes in this output signal.

Rigid ball integration sections 7a, 7b, and 7c retain rigid balls 50, 55, and 60. The following is a detailed description for rigid ball integration section 7a, by referring to FIG. 4, although rigid ball integration sections 7b and 7c are configured in, and operate in, a similar manner.

Referring now to FIG. 4, rigid ball integration section 7a includes compressed spring accommodating section 70a, rigid ball contacting section 52, compressed spring 53 which energizes rigid ball contacting members 52 accommodated in compressed spring accommodating section 70a, screw 54 for fastening rigid ball contacting member 52 and compressed spring 53 within compressed spring accommodating section 70a, rigid ball accommodating section 71a formed from the bottom of compressed spring accommodating section 70 to facet 72a of rigid ball integration section 7a, and rigid ball 50 accommodated in rigid ball accommodating section 71a.

Rigid ball contacting member 52 is a guiding member to receive rigid ball 50 in such a manner that rigid ball contacting member 52 and rigid ball 50 are in contact. Moreover, rigid ball contacting member 52 is preferably made of a metal that is harder than rigid ball 50. It is preferable to form rigid ball contacting member 52 in a flat plane so as to make a point contact with rigid ball 50. Compressed spring 53 energizes rigid ball contacting member 52 towards lens frame 6.

Rigid ball accommodating section 71a accommodates rigid ball 50 while slightly protruding from facet 72a. As the inner diameter of rigid ball accommodating section 71a is smaller than the inner diameter of compressed spring accommodating section 70a, rigid ball contacting member 52 does not pop out from compressed spring accommodating section 70a when energized by compressed spring 53.

Facet 72a is a guiding member to receive lens frame 6 when lens frame 6 moves left in FIG. 4. It is preferable to form facet 72a in a flat plane so as to make a plane contact with rigid ball contacting member 51.

Under the conditions illustrated in FIG. 2, when voice coil motor 40 generates downward thrust PY to lens frame 6 along the BY direction axis, lens frame 6 moves, due to thrust PY, while sliding along guiding shaft 9 upward to the right. Guide arm 10 rotates clockwise, due to thrust PY, as illustrated by arrow 100 in FIG. 4. With the rotation of guide arm 10, guiding shaft 9 is forced to move horizontally in the direction D (see FIG. 2) that is perpendicular to the longer side of guiding shaft 9.

As shown in FIG. 4, hood parts 6d and 6e are engaged so that guiding shaft 9 moves only slightly towards optical axis I. As guide arm 10 rotates, guiding shaft 9 moves slightly towards optical axis I in relation to hood parts 6d and 6e. However, lens frame 6 is energized towards rigid balls 50, 55, and 60 by springs 64, 65, and 66. Rigid balls 50, 55, and 60 control the movement towards optical axis I.

Under the conditions illustrated in FIG. 2, when voice coil motor 41 generates thrust PX to lens frame 6 towards the left along the axis line in the BX direction (hereinafter referred to as the "BX direction axis"), lens frame 6 moves, due to thrust PX, while sliding along guiding shaft 9 upward towards the left. Moreover, guiding shaft 9 is forced to move in the direction D (see FIG. 2) that is perpendicular to the longer side of guiding shaft 9. Lens frame 6 can move to any location over a plane that is substantially perpendicular to optical axis I. As lens frame 6 engages with guiding shaft 9 with hook parts 6d and 6e, the rotation around optical axis I is securely controlled.

Under the conditions illustrated in FIGS. 3 and 4, lens frame 6 starts moving toward the left when lens frame 6 receives a strong force caused by an impact towards the left in the figures. Rigid ball contacting members 51, 56, 61, 52, 57, and 62 receive an impact focused in point contact areas with rigid balls 50, 55, and 60 since rigid balls 50, 55, and 60 are in point contact with rigid ball contacting members 51, 56, 61, 52, 57, and 62.

At this time, rigid ball contacting members 51, 56, and 61 push both rigid balls 50, 55, and 60 and rigid ball contacting members 51, 56, and 61 toward the left, thereby bending compressed springs 53, 58, and 63. As compressed springs 53, 58, and 63 absorb the impact, rigid ball contacting members 51, 56, 61, 52, 57, and 62 do not receive the impact in the area that makes contact with rigid balls 50, 55, and 60, thereby eliminating the formation of concave dents in the contacting area.

When lens frame 6 receives an impact that exceeds a set value, facets 72a, 72b, and 72c catch lens frame 6, thereby stopping the movement of lens frame 6. At this time, facets 72a, 72b and 72c make a flat contact with rigid ball contacting members 51, 56, and 61. Consequently, concave dents are not formed in the contacting areas of rigid ball contacting members 51, 56, and 61 and facets 72a, 72b, and 72c.

Rigid balls 50, 55, and 60 are held between rigid contacting members 51, 56, and 61 and rigid ball contacting members 52, 57, and 62 due to the energizing force of springs 62, 65, and 66. As a result, rigid balls 50, 55, and 60 do not fall out of rigid ball accommodating sections 71a, 71b, and 71c even if lens frame 6 moves toward the left in, for example, FIGS. 3 and 4.

Under the conditions illustrated in FIGS. 3 and 4, if lens frame 6 receives an impact to right in the figures, lens frame 5 begins moving toward the right against the energizing force of springs 64, 65, and 66. At this time, rigid ball contacting members 51, 56, and 61, and rigid ball contacting members 52, 57, and 62 move away from each other, respectively.

Springs 64, 65, and 66 can absorb this impact if the impact is small. However, if the impact is great, lens frame contacting sections 8a, 8b, and 8c catch lens frame 5, thereby stopping the motion thereof. As lens frame 6 makes contact with lens frame contacting sections 8a, 8b, and 8c when it moves for a specified distance, there is almost no possibility of rigid balls 50, 55, and 60 falling out of rigid ball accommodating sections 71a, 71b, and 71c.

With the use of protective lenses 4 and 5, there is a reduced possibility of foreign material entering lens frame 6 from opening sections 73 and 82, or inadvertently touching compensation lens 3 or the drive mechanism.

According to the above embodiments of the present invention, compensation lens 3 and the drive mechanism are protected by protective lenses 4 and 5. However, both lenses are not necessary, and only one lens can be provided. For example, protective lens 4 can be provided without protective lens 5. Alternatively, protective lens 5 can be provided without protective lens 4. Moreover, protective members having appropriate permeability characteristics can be used in place of protective lenses 4 and 5.

An aperture shutter unit can be provided instead of aperture unit 30. Protective lens 5 may be omitted if aperture unit 30, or an aperture shutter unit, is provided on base frame 7. Protective lens 4 may be omitted if aperture unit 30, or an aperture shutter unit, is provided on the frame member 8 side. If the aperture shutter unit is provided on base frame 7 or frame member 8, opening section 73 may be closed with this aperture shutter unit. As a result, integrating a motion compensation device, or handling when the lens barrel is changed, becomes relatively easy and there is a reduced possibility of foreign material entering from opening section 73.

Therefore, according to the above embodiments of the present invention, an enclosure that accommodates compensation lens 3 and the drive mechanism is formed by integrating base frame 7 (which retains protective lens 4) and frame member 8 (which retains protective lens 5) More specifically, according to embodiments of the present invention, a compensation lens and a drive mechanism are provided within a base frame (such as, for example, the combination of base frame 7 and frame member 8). Protective members are attached to at least one of the openings on the ends of the base frame. Consequently, the compensation lens and the drive member are enclosed by the base frame and protective members. As a result, the compensation lens and drive mechanism are not exposed to external influences (such as, for example, dust and particles, or human touching), the compensation lens and drive mechanism are more easily handled, and the assembling efficiency of the lens barrel is improved.

Therefore, according to the above embodiments of the present invention, a frame (such as, for example, the combination of base frame 7 and frame member 8) forms an enclosure with first and second openings (such as, for example, opening sections 73 and 82), to substantially enclose a compensation lens and a drive mechanism. First and second protective members (such as, for example, first and second protective lenses 4 and 5) substantially close the first and second openings.

Moreover, according to the above embodiments of the present invention, an aperture unit or aperture shutter unit can function as a protective member to protect compensation lens 3 and the drive mechanism. As a result, assembling efficiency of the lens barrel is improved and the various components are more easily handled.

Furthermore, according to the above embodiments of the present invention, a compensation lens can be positioned relatively close to an aperture unit or an aperture shutter unit where light flux is focused. As a result, the lens diameter of the compensation lens can by reduced, thereby reducing the load to the drive mechanism and also reducing power consumption.

According to the above embodiments of the present invention, a frame includes multiple frame members. For example, a frame is formed by the combination of base frame 7 and frame member 8. The frame members (that is, base frame 7 and frame member 8) are engaged with each other by position setting sections (such as position setting sections 7h, 8h). The center of compensation lens 3 and the center of aperture unit 30 or an aperture shutter unit coincide with the optical axis I and their positions are accurately set based on the compensation lens as a reference. More specifically, the frame members are mutually engaged by position setting sections that align the centers of the compensation lens, the aperture unit, and the aperture shutter unit, to the optical axis.

According to the above embodiments of the present invention, a lens apparatus, such as a camera, has an optical axis extending therethrough. The lens apparatus includes a compensation lens, a drive mechanism, a frame and a protective member. The compensation lens is movable in a direction not parallel to (and preferably substantially perpendicular to) the optical axis to compensate for motion of the lens apparatus. The drive mechanism moves the lens in the direction not parallel to the optical axis. The frame holds the lens and the drive mechanism. The frame has a first end and a second end so that light travelling along the optical axis of the lens apparatus passes through the first end to pass through the compensation lens and then out the second end. The protective member is positioned in one of the first end and the second end of the frame, to protect the compensation lens and the drive mechanism The protective member can include a first protective lens positioned in the first end of the frame so that light travelling along the optical axis of the lens apparatus passes through the first protective lens and then through the compensation lens, wherein the first protective lens moves with the compensation lens in the direction not parallel to the optical axis.

In addition, the protective member can include a second protective lens positioned in the second end of the frame so that light travelling along the optical axis of the lens apparatus passes through the first protective lens, the compensation lens and then through the second protective lens. In this case, the first protective lens and the second protective lens would move with the compensation lens in the direction not parallel to the optical axis. The relative positioning along the optical axis of the second protective lens to the compensation lens, and of the first protective lens to the compensation lens, is maintained as the first and second protective lenses and the compensation lens move in the direction not parallel to the optical axis.

Further, instead of using protective lenses to protect the compensation lens and the drive mechanism, a protective member can be an aperture unit or a shutter unit positioned in the first end or the second end of the frame and controlling the amount of light travelling along the optical axis.

In addition, the lens apparatus can include a housing (such as lens barrel 2 in FIG. 1) which houses the frame (such as the combination of base frame 7 and frame member 8), the drive mechanism, the compensation lens and the protective member, wherein the drive mechanism, the compensation lens and the protective member are assembleable together onto the frame as a unit which is insertable into the housing. Therefore, the drive mechanism and the compensation lens can be assembled onto the frame and independently tested outside the housing. This independently tested and assembled unit can then be shipped, handled, and installed into, for example, a lens barrel of a camera. Such independent testing and assembly provides significant advantages over a motion compensation device which must be assembled into the lens barrel at the same time as other components are assembled into the lens barrel. In addition, such independent testing and assembly provides significant advantages over a motion compensation device which cannot be operated and tested outside the lens barrel.

Moreover, according to the above embodiments of the present invention, various lens groups can be utilized without increasing the number of parts by integrating frame members that retain the lenses in the front and rear. Additionally, the drive mechanism and lens group 104 (which includes compensation lens 3) can be placed within the lens barrel without requiring a highly sophisticated assembling technology.

Although lens frame 6 is generally illustrated as retaining only a single compensation lens 3, it is apparent that compensation lens 3 may be formed of multiple lenses. Further, any of the lenses illustrated and described herein can be formed of a single or multiple lenses.

Moreover, although voice coil motor 41 generates thrust towards the left (see, for example, FIGS. 3 and 4) along the BX direction axis, it may also generate thrust towards the right (see, for example, FIGS. 3 and 4) along the BX direction axis. Both voice coil motors 40 and 41 may be driven individually or simultaneously.

According to the above embodiments of the present invention, compressed springs 53, 58, and 63 absorb impact. However, various other materials can be used for this purpose. For example, rubber, with a resilient capability that can absorb the impact, may be used.

According to the above embodiments of the present invention, a camera has an optical axis extending therethrough. A compensation lens is movable in a direction not parallel to (and preferably perpendicular to) the optical axis to compensate for motion of the camera. A drive mechanism moves the lens in the direction not parallel to the optical axis. A frame holds the lens and the drive mechanism. The frame has a first end and a second end so that light travelling along the optical axis of the camera passes through the first end to pass through the compensation lens and then out the second end. A first protective lens is positioned in one of the first and second ends of the frame so that light travelling along the optical axis of the camera passes through the first protective lens and the compensation lens. The first protective lens moves with the compensation lens in the direction not parallel to the optical axis. A second protective lens can also be positioned in the other of the first and second end of the frame of which the first protective lens is positioned.

According to the above embodiments of the present invention, an aperture unit or a shutter unit can be used as a protective member to protect a compensation lens. Aperture units and shutter units are well known. For example, an aperture unit is a unit which creates an aperture for controlling the amount of light travelling along the optical axis. Such an aperture unit can be, for example, a diaphragm having a controllable aperture size. An aperture and shutter function can also be combined into a single, aperture shutter unit which provides both a controllable aperture size function and a shutter function. This aperture shutter unit can also be used as a protective member.

In the above embodiments of the present invention, a lens barrel, such as the lens barrel illustrated in FIG. 1, is described as being a zoom lens with five different lens groups. However, the present invention is not intended to be limited to any specific type of lens barrel, or to any specific number of lens groups. For example, the present invention is applicable to a lens barrel which is not a zoom lens. Also, the present invention is applicable to a lens group with less than, or more then, five lens groups.

According to the above embodiments of the present invention, voice coil motors 40 and 41, guiding shaft 9, springs 64, 65, and 66, are collectively be referred to as a "drive mechanism" for moving compensation lens 3. However, a drive mechanism is not intended to be limited to these specific components. Instead, there are many different components and mechanisms which can be used to move compensation lens 3, and the embodiments of the present invention are not intended to be limited to any specific embodiment.

According to the above embodiments of the present invention, a compensation lens and a drive mechanism are housed by a base frame. Thus, the term "base frame" can refer to an overall frame which includes a plurality of frame members, or a single member. In other words, a base frame is not intended to be limited to any specific number of frame members.

The present invention is described as relating to a camera. However, the present invention is not intended to be limited to a camera. For example, the present invention can be used in devices including, but not limited to, camcorders, motion picture cameras, telescopes, binoculars, microscopes, range finding equipment, lasers, fiber optic communication systems, various optical projection systems, and CD mastering systems.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A lens apparatus having an optical axis extending therethrough, comprising:

a compensation lens to compensate for motion of the lens apparatus by moving the compensation lens in a direction not parallel to an optical axis;

a drive mechanism to move the lens in the direction not parallel to the optical axis;

a first protective lens having an optical axis, and positioned on a side of the compensation lens;

a first lens frame to support the first protective lens;

a second protective lens having an optical axis, and positioned on a side of the compensation lens opposite the first protective lens; and a second lens frame to support the second protective lens, wherein the first lens frame and the second lens frame include mutually contacting portions, and the mutually contacting portions adjust the optical axis of the first protective lens and the optical axis of the second protective lens such that the respective optical axes coincide.

2. A lens apparatus as recited in claim 1, wherein the respective contacting portions include a flange structure such that the optical axis of the first protective lens and the optical axis of the second protective lens coincide.

3. A lens apparatus as recited in claim 1, wherein the contacting portions include alignment mechanisms to align the optical axes.

4. A lens apparatus as recited in claim 1, wherein relative positioning along the optical axis of the first protective lens and the second protective lens to the compensation lens is maintained as the compensation lens moves in the direction not parallel to the optical axis.

5. A lens apparatus as recited in claim 1, further comprising an aperture unit positioned in an end of the first lens frame to control an amount of light travelling along the optical axis and passing through the first lens frame to the compensation lens.

6. A lens apparatus as recited in claim 1, further comprising a shutter unit positioned in an end of the first lens frame to control an amount of light travelling along the optical axis and passing through the first lens frame to the compensation lens.

7. A lens apparatus as recited in claim 1, wherein the lens apparatus is a camera.

8. A lens apparatus as recited in claim 1, wherein the direction not parallel to the optical axis is a direction perpendicular to the optical axis.

9. A lens apparatus as recited in claim 1, wherein the first lens frame, the first protective lens, the second lens frame, and the second protective lens form an enclosure, to substantially enclose the compensation lens.

\* \* \* \* \*